Oct. 26, 1971     G. BATE ET AL     3,614,830
METHOD OF MANUFACTURING LAMINATED STRUCTURES
Filed Feb. 28, 1969     3 Sheets-Sheet 1
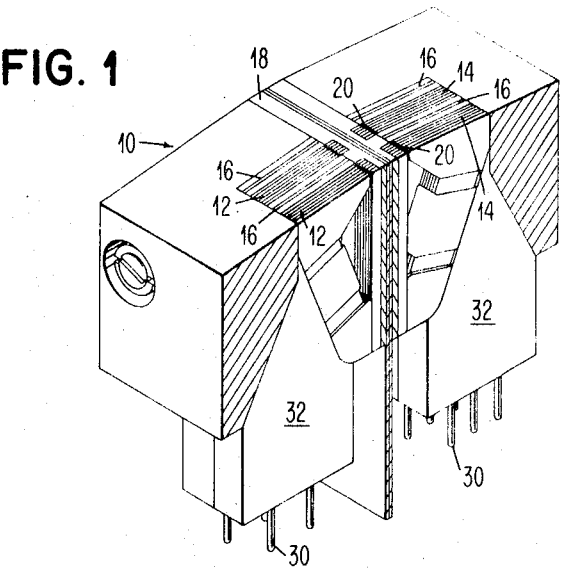
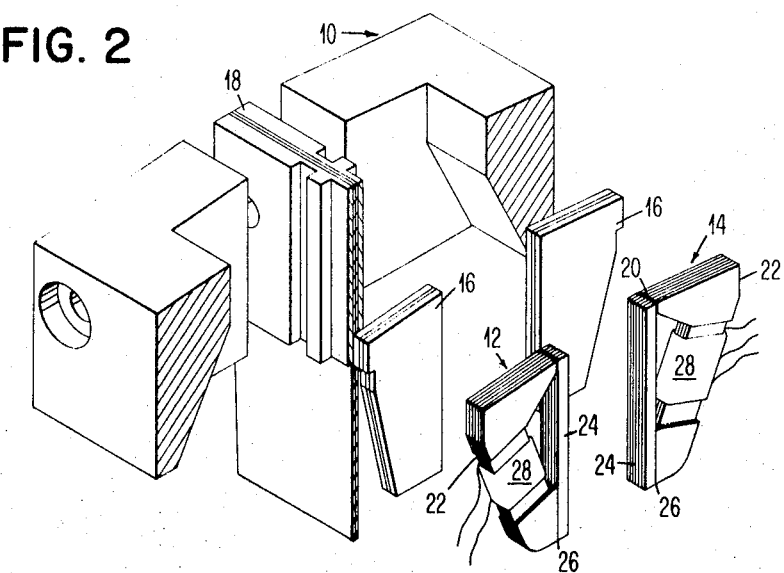
INVENTORS
GEOFFREY BATE
GEORGE W. BROCK
BY *Donald W. Margolis*
ATTORNEY FIG. 3
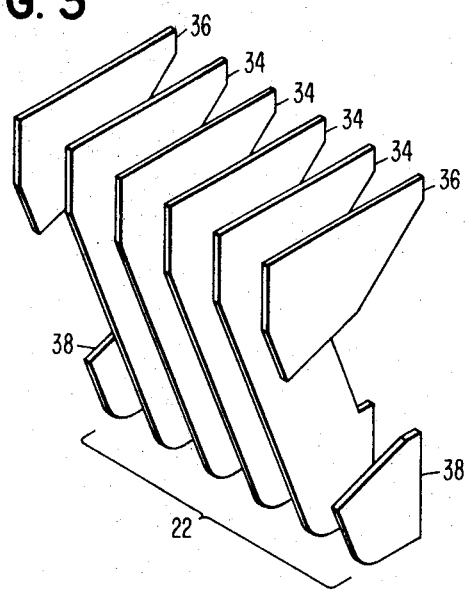
FIG. 4
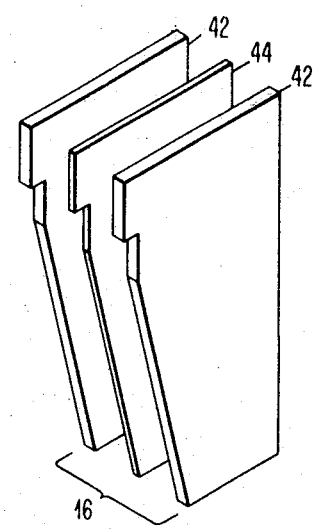
FIG. 5
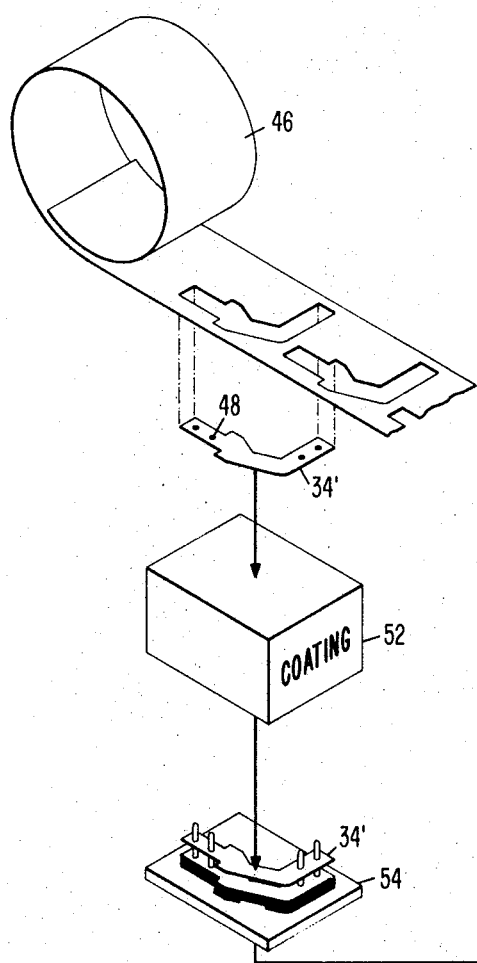
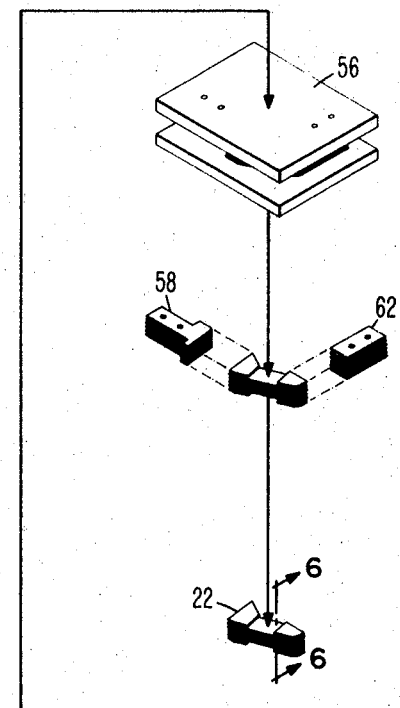

United States Patent Office 3,614,830
Patented Oct. 26, 1971

3,614,830
METHOD OF MANUFACTURING LAMINATED STRUCTURES
Geoffrey Bate and George W. Brock, Boulder, Colo., assignors to International Business Machines Corporation, Armonk, N.Y.
Filed Feb. 28, 1969, Ser. No. 803,263
Int. Cl. H01f 7/06
U.S. Cl. 29—603
11 Claims

ABSTRACT OF THE DISCLOSURE

A laminated structure, including lamina of metallic magnetically permeable material, constructed with each lamina separated from each next adjoining lamina by a thin layer of electrically non-conductive material, with the exception that each lamina is joined and interconnected in a random pattern through the non-conductive layer to each adjacent lamina. The interconnections between each pair of laminae cover about 10%, or less, of each lamina's surface area. Laminated structures of this type are produced by providing a thin, electrically non-conductive coating upon the surface of metallic lamina, stacking a plurality of coated laminae, including magnetically permeable lamina, in registered contacting relationship, and then heating the stacked laminae at a temperature and for a time sufficient to simultaneously anneal the magnetically permeable material and cause each lamina to be diffusion bonded through the non-conductive layer to each adjacent lamina in a random pattern covering about 10%, or less, of each lamina's surface area.

BACKGROUND OF THE INVENTION

Field of the invention

The present invention relates to laminated structures, the manufacture of laminated structures, and more particularly, to laminated structures including metallic and magnetically permeable material. Such structures are useful in transformers, motors, generators, transducers, and similar electro-magnetic embodiments.

Description of the prior art

Laminated structures are utilized in transformers, motors, generators, transducers, and similar articles to alter electric current and voltage, induce magnetic fields when subjected to current, generate electric current when subjected to magnetic flux, and in other ways convert and divert electric or magnetic energy. In these various applications, in order to reduce eddy current losses, magnetically permeable structures are utilized which are laminated rather than monolithic. Generally, where there is relative motion between a conductive structure and a magnetic field or a time variation of the magnetic field and the conductive structure, it has been taught that each lamina must be completely electrically discrete and insulated from each next adjacent lamina to avoid or minimize eddy current losses.

Eddy currents occur where there is relative motion between a conductive object and a magnetic field or when a conductor is subjected to a time varying magnetic field. Eddy currents are set up in the conductor in such a direction that the resulting magnetic forces on the eddy current elements tend to stop relative motion or the growth or decay of the magnetic field. In order to continue to operate and to overcome the tendency of eddy current forces to stop relative motion, additional energy must be supplied, thus making the operation inefficient. Eddy currents and eddy current losses would occur, for example, in the armature of a motor or a generator, or in the core of a transformer or transducer, if it were a solid, conductive element. By constructing armatures, transformer cores and transducer heads from thin sheets of conductive material, laminae, the eddy current losses can be kept to a negligible magnitude, and the efficiency of the operation improved. Lamination of such elements has little effect on magnetic flux since the flux lines are oriented to pass through the laminae edge wise and do not need to cross from one lamina to the next. By maintaining the lamina electrically insulated from one another, eddy currents are confined to circulation within each individual sheet. With such a laminated structure, two factors contribute to the reduction of eddy currents and of eddy current losses. First, the length of each individual conductor in which eddy currents may be established is limited to the thickness of the lamina, so that only a small electro-motive force can be generated. Second, the resistance of the eddy current path is very large because this path is of small cross-sectional area.

Various prior art laminated structures have been proposed as well as various methods of making such structures. In obtaining such structures, it has previously always been taught that continuous layers of non-conductive material must be completely interposed between laminae to minimize eddy current losses. Regardless of the non-conductive material which is interposed between laminae, the method of interposing it, or the sequence in which it is interposed, the prior art has always specifically taught that complete and continuous insulation between laminae is required. Moreover, the prior art has taught that electrical contact between adjacent laminae is positively to be avoided, completely, in any degree whatsoever.

It has now been determined that, while eddy current losses are detrimental to the results achieved when a conductor and a magnetic field are moving relative to one another, other factors exist which are detrimental and cause even greater losses in such a system. In some instances, for example, magnetic characteristics, such as the magnetic permeability of a ferro-magnetically soft conductive material, are required to be optimized in order to obtain the best possible results. Such desirable magnetic characteristics are most often optimized by annealing the magnetic material.

Normally, in the formation of a laminated structure, magnetic material is annealed in bulk, formed into laminae, completely coated with non-conductive material, and then stacked to form a laminated structure which is bonded together. Thus, between annealing and formation of the final structure, the laminae may be subjected to many sources of stress, such as punching or cutting to form the individual laminae and handling during stacking. Furthermore, as a result of joining the laminae together, other stresses are introduced due to the relative expansion or contraction of adhesive material used between laminae to bond them together or due to the compressive forces of mechanical means utilized to join the laminae. It is well known, of course, that stresses set up in the lamina will change its flux carrying ability, e.g. its permeability. Thus, the various stresses and strains induced in the individual laminae during processing and handling may cause degradation of their magnetic properties and concomitantly, the magnetic properties of the final laminated structure.

Degradation of magnetic properties due to stress could be overcome by once more annealing the complete laminated structure. However, at this point in the process, reannealing of the laminated structure is usually rendered impractical, if not impossbile. In the most common instance, the laminae have been both joined and insulated by a compound which is organic in nature, such as epoxy resin. Subjecting such a stack to annealing, which usually requires temperatures on the order of more than 1,000°

C. would cause complete carbonization of the organic compound, thus destroying both the adhesive bonding and the insulation between laminae. In other instances, during the course of construction, additional metallic elements are added to the laminated structure. In such a case, the heating and cooling required for annealing is likely to cause relative expansion and contraction of the parts so that strain is introduced into the system immediately upon cooling it from the annealing temperature. In still other cases, added elements would melt or be detrimentally oxidized or otherwise contaminated at the annealing temperature.

For these and other reasons, utilizing the prior art techniques, the actual permeability of a laminated structure is normally considerably under the theoretical maximum value. Maximum permeability may be determined by measuring the permeability of laminae which have been annealed and which have not been subjected to eddy current losses or strain.

SUMMARY OF THE INVENTION

It is an object of the present invention to provide an improved laminated structure.

Another object of this invention is to provide a laminated, magnetic structure which has high permeability and relatively low eddy current loss characteristics.

It is a further object of this invention to provide a novel technique for achieving magnetic structures having desirable permeability and eddy current loss characteristics.

Another object of this invention is to provide a novel, laminated magnetic structure in which contact between laminae exists without substantial eddy current losses.

The present invention makes beneficial use of the phenomenon that for a wide range of metallic magnetically permeable materials the annealing temperature approaches or shares a portion of its welding or diffusion temperature. The manufacturing process provided by the invention contemplates the production of laminated structures in which electrically insulated laminae are stacked in contacting relationship and heated for a time and at a temperature to simultaneously cause annealing of the magnetic material and a minor amount of welding or diffusion bonding from one lamina to another. The resulting structure, without the use of additional adhesive or mechanical joining means, is a well-bonded substantially unitary laminated structure exhibiting both high permeability and negligible eddy current losses. These results are achieved by forming sheet material into laminae of the required size and shape, providing a thin, non-conductive coating on the facing portions of the laminae, stacking the laminae in registered contacting relationship, and then subjecting the stack to annealing heat for a time sufficient to both anneal the magnetic material and cause diffusion of metallic material from one laminae to the next adjacent laminae to form bonding tacks. In the desired operation reflow causes approximately 10%, or less, high resistance electric contact between the adjacent surfaces of each adjacent lamina.

The resulting laminated structure may then be operationally placed into its ultimate use or it may be further shaped and finished by mechanical means. Where additional working of the laminated structure is contemplated, which work causes strain on the system and reduces its magnetic permeability, the stack may be once more annealed without fear of deterioration of the insulating material or destruction of the material joining the laminae together.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is a perspective, partial sectional view of a transducer, including laminated portions in accordance with the present invention;

FIG. 2 is an exploded perspective view of the transducer of FIG. 1, showing the laminated assemblages of which it is formed;

FIG. 3 is an exploded perspective view of a portion of the transducer assembly, illustrating laminae employed to make up a head member pole piece;

FIG. 4 is an exploded, perspective view of a portion of the transducer assembly, illustrating the laminae employed to make up the inter-track shield which resides between head members;

FIG. 5 is a diagrammatic, schematic showing the various steps involved in fabricating a laminated magnetic structure for use in a magnetic transducer according to the present invention;

DESCRIPTION OF THE PREFERRED EMBODIMENTS

Figure 6:
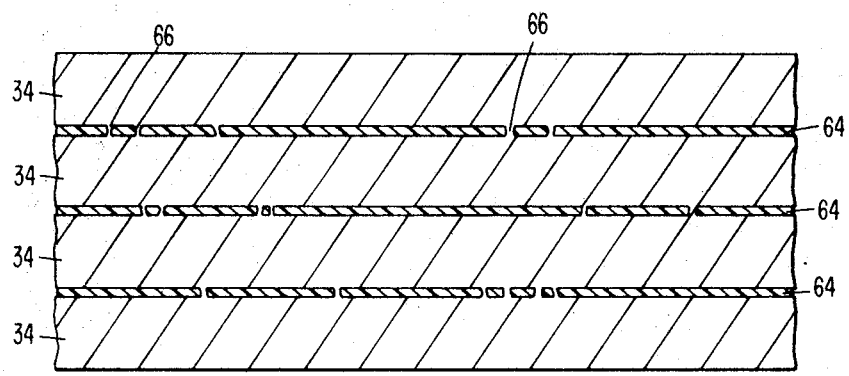
FIG. 6 is a sectional view taken along lines 6—6 of FIG. 5 showing in enlarged and exaggerated detail the spacing and welding obtained between laminae in a laminated structure according to the present invention.

In carrying out the present invention, the actual materials utilized in forming a laminated structure, as well as the shape and number of lamina, will be controlled by the ultimate use to which the structure is to be put. However, the present invention is applicable to substantially all laminated structures with little regard to the materials or the ultimate use of the structure. It is especially useful where the laminated structure includes ductile metallic materials, especially those which are magnetically permeable, and therefore subject to enhancement of magnetic properties by annealing. Included in these materials are nickel-iron alloy compositions, including many compositions containing 1 to about 15% of added elements or two or more added elements, such as molybdenum, chromium, manganese, copper, vanadium, titanium, silicon, aluminum, and tungsten. Also, included are the iron-nickel-cobalt alloy compositions, including compositions containing 1 to about 15% of added elements. Included in the iron-cobalt series, are those alloys having an iron content of 25%, or higher, the balance chiefly cobalt, with or without small amounts of added elements. These materials are generally magnetically soft. The present invention is also generally limited in application to laminae formed of metallic materials. By this, it is meant that the materials are generally ductile and conductive, not possessing high electrical resistance. It includes most metals and alloys, but excludes materials which, while predominately metal, are brittle and of low conductivity.

An important and representative example of the use of the present invention would be in the construction of magnetic recording transducers. In the electronic computer art, for example, magnetic recording media is used to store coded information arranged so that a particular combination of signals, simultaneously recorded on various channels thereof, represents data. Data of this type is normally recorded and read by a magnetic transducer.

A transducer, in elemental form, includes at least one head of magnetically permeable material forming a magnetic circuit, substantially in the shape of a core, that has a working gap therein, together with an electrically conducting coil wound around a portion of the head for controlling or responding to magnetic flux in the magnetic circuit. More often a transducer consists of a plurality of write heads and a plurality of read heads, in combination, which operate together to write and read a plurality of related data tracks on a magnetic recording media. In the latter case, the transducer is normally separated into a plurality of alternate magnetic heads with a shield section between each head. Both the head and shield components of the transducer are often formed of laminated structures.

Before describing in detail the laminated structure of the present invention and the method of making it, it is desirable to become more familiar with the structure and operation of a typical embodiment, such as a magnetic transducer.

Referring now in detail to the drawings, FIG. 1 shows an assembled multi-head transducer, in a cutaway view, for use in a system where magnetic recording media is moved relative to the transducer. The device includes a housing 10 of non-magnetic material, such as brass or aluminum, which supports the operative parts of the assembly. Housing 10 carries a plurality of magnetic heads 12 which are capable of writing magnetic signals and a similar number of magnetic heads 14 which are capable of reading magnetic signals. Each magnetic head is arranged in spaced apart, side-by-side relation, spaced from its neighbors by inter-track shield members 16, which are also mounted in housing unit 10. Shield members 16 define spaces between recording tracks and also serve to reduce cross-talk between adjacent heads. The read and write heads 12 and 14 are arranged on opposite sides of a center shield member 18. They are aligned longitudinally so that one write head and one read head follow the same channel or track on a magnetic recording media (not shown) passing longitudinally adjacent the operating surface of the transducer. Each write and read head has a working gap 20 exposed at the operating surface, as shown.

To better illustrate the construction of the transducer assembly, FIG. 2 shows representative major components exploded away from one another. As can be seen, heads 12 and 14 comprise a plurality of laminations of magnetically permeable material. The laminations may be bonded together in any number of ways. In this embodiment, representative of the present invntion, the laminations are bonded together by high resistance diffusion welding tacks formed in situ between the laminae during the annealing process as detailed below. Each magnetic head is normally formed of two separate laminated structures, pole pieces 22 and 24, which are separated at their write or read faces by working gap 20. Pole pieces 22 and 24 are also normally separated at their lower ends for ease in assembly so that a back-gap 26 also exists. Gap 26 alters the reluctance of the head somewhat, but does not form a working element in the transducer. In order to provide a source of energizing current to induce magnetization in write head 12 or as a path for induced current caused by magnetization effecting read head 14, a coil of conductive wire 28 is operatively wrapped around a portion of each head at pole piece 22. When head 12 is mounted in housing 10, as shown in FIG. 1, the ends of coil 26 are connected to terminal pins 30 in a connective block 32 attached to housing 10.

Inter-track shields 16 serve to space adjacent heads physically, magnetically and electrically apart. Like heads 12 and 14, shields 16 are also normally constructed of laminae. Some of the laminae, including the outermost ones, are normally formed of conductive, magnetically non-permeable material. Other laminae, are usually constructed of magnetically soft and permeable material similar to that of the head laminae. Intertrack shield laminated structures 16 may also be bonded together by the diffusion welding techniques taught by the present invention in a similar fashion to the laminated head structures.

It will be understood that the read heads 14 and the inter-track shields 16 between them are constructed and assembled in essentially the same manner as described for the write portion of the transducer.

Referring now to FIG. 3, there is shown an exploded view of a group of magnetically permeable laminae, such as may be joined together to form pole piece 22 of magnetic write head 12. Four central laminae 34, generally in the shape of a C are bracketed by two pairs of end laminae 36 and 38. When joined together as a laminated structure, the indented portion between end laminae 36 and 38 serves to define a channel within which conductive coil 28 can be wrapped in such a manner that its profile remains below the surface of laminae 36 and 38, as shown in FIG. 2. This configuration thus allows pole piece 22 to be placed in close abutting relation with adjoining flat shield portions 16. While this pole piece is shown to be composed of any a small number of laminae, in actual practice, it is common to use from 2 to 50, or more, laminae in such a structure, depending upon the thickness of the laminae and the desired thickness of the final laminated structure.

Laminae 34, 36, and 38 are generally on the order of about one-tenth mil to about 5 mils thick and are normally punched, cut, or etched from foil stock available commercially in roll form. Head lamina material is magnetically soft and highly permeable. Preferred materials are metallic alloys of nickel and iron containing, as a minimum, about 30% nickel. Additionally, the alloy may include, as a maximum, about 15% of one or more added elements, such as aluminum, copper, molybdenum, chromium, manganese, titanium, silicon, vanadium, or tungsten. The most commonly used alloys are 77–83% nickel, and 3–6% molybdenum, with the balance iron. Included in this group are many commercially avaliable foils, such as Hy Mu 80, Hy Mu 800, Superm-alloy, 4–79 molybdenum permalloy, English Mumetal, Muvar, and Supermax. Other suitable commercial alloys include Manimax (47% nickel, 3% molybdenum, balance iron), U.S. Mumetal (77% nickel, 5% copper, 2% chromium, balance iron), French Mumetal (78% nickel, 6% copper, 4% molybdenum, balance iron), permalloy (30% nickel as a minimum, balance iron), chrome permalloy (45% nickel, 6% copper, balance iron) and radiometal (45% nickel, 5% copper, balance iron). While the present invention is not limited to these materials, they are suitable for its practice as to both their magnetic and metallic characteristics.

As shown in exploded view in FIG. 4, inter-track shield 16 consists of a number of laminae. Outer laminae 42 are preferably formed of conductive, metallic, magnetically non-permeable material, such as copper, brass, silver, bronze, Phosphor bronze, aluminum, or similar material. Its preferred thickness is on the order of 1 to 5 mils. Inner lamina 44 is formed of the same types of metallic magnetically permeable material as pole piece 22. When combined as a laminated structure to form an inter-track shield in a transducer, it functions to define the space between adjacent heads and to prevent electric and magnetic interference from head to head. In its preferred embodiment, it also includes non-conductive material between each laminae. This non-conductive material increases reflectance of stray signals by causing impedance mismatch. While only a simple three-laminae structure is shown, it is common practice to use 10 to 20 inner laminae of metallic magnetically permeable material in a shield.

In the practice of the present invention, the process illustrated schematically in FIG. 5 is generally followed. The process shown is one for making pole piece 22, but may be applied with equal facility to the process of making any laminated structure from metallic lamina. In the practice of the process of the present invention, stock 46, normally in the form of a roll of foil having predetermined thickness, is punched, cut, or etched to form a plurality of "rough" laminae 34'. In the preferred practice of this process, each laminae includes a number of guide holes 48 which are precisely located to allow the lamina to be accurately stacked on a jig in a predetermined relationship. Each lamina 34' is next provided with a thin coating of non-conducting material at coating station 52. This coating is preferably of a metallic oxide or compound, and may be provided by any of the numerous methods known in the prior art. Included among the suitable inorganic insulating materials are aluminum oxide and its compounds, silicon oxide and its compounds, zirconium oxide, titanium oxide, iron oxide, calcium silicate, aluminum silicate, calcium phosphate, magnesium phosphate, and magnesium oxide, as well as the oxides of lithium, beryllium, strontium, barium, boron, lead, thorium, tantalum, tin, and cerium. They may be coated on the laminae as a portion of a slurry, formed in situ by the oxidation or decomposition of suitable compounds, or otherwise applied adherently and continuously to the surface of each lamina. As an alternative, the laminae may be subjected to suitable heat conditions in the presence of oxygen, for example, in the range of about 260 to 540° C., so that the surface material of the lamina is oxidized to form a thin non-conductive inorganic shell.

After being suitably provided with non-conductive material, the desired number of laminae 34' are stacked upon jig 54. While an array suitable for forming a single laminated structure is shown, it is common to use a jig fixture capable of supporting and aligning a number of laminated structures. After the desired number of laminae are placed on jig 54 it is common practice to secure a cover 56 in close relationship with the jig. Cover 56 serves the function of insuring flatness to laminae which may have retained some curvature from their original rolled foil source. Additionally, shim members, not shown, may be placed between cover 56 and the base of jig 54 to control the thickness of the final laminated structure. The thus coated and stacked lamina are next subjected to annealing temperatures for several minutes or several hours and allowed to cool.

Upon the removal of cover 56 the laminated structure is found to be formed into a unit by the diffusion bonding technique of the present invention. Testing of the structure for permeability indicates that it possess permeability far superior to that of similar laminae bonded together by adhesive means. At this point, it is desirable to remove tab sections 58 and 62 of the laminated structure, including guide holes 48. If this is done before laminated structure 22 is wrapped with conductive wire or otherwise placed in contact with low melting point materials or materials having a different coefficient of expansion, the structure with portions 58 and 62 removed may be once more subjected to annealing to remove any stresses imparted during the removal of tabs 58 and 62. Following the steps of this process provides a diffusion bonded laminated pole piece 22 having high permeability and low eddy current losses which is suitable for use in the formation of a superior transducer.

The result that the process of this invention has upon the final laminated structure is best shown by reference to FIG. 6, which is an enlarged and exaggerated partial sectional view taken along lines 6—6 of pole piece 22 in FIG. 5. The structure includes laminae 34 substantially separated from one another by a layer of inorganic non-conductive material 64. Laminae 34 are interconnected with one another through non-conductive material 64 by means of diffusion welding formed tacks 66. Tacks 66 are dispersed randomly between the lamina, preferably covering 10%, or less, of each lamina's surface area. For the most part, each tack is small and discrete and provides a high resistance path to eddy currents.

The following exmples set forth some preferred examples of the practice of the present invention. They are, of course, intended to be illustrative of the preferred embodiments and mode of operation and are not intended to be limiting as to the scope of the invention.

Control experiment

Figure 7:
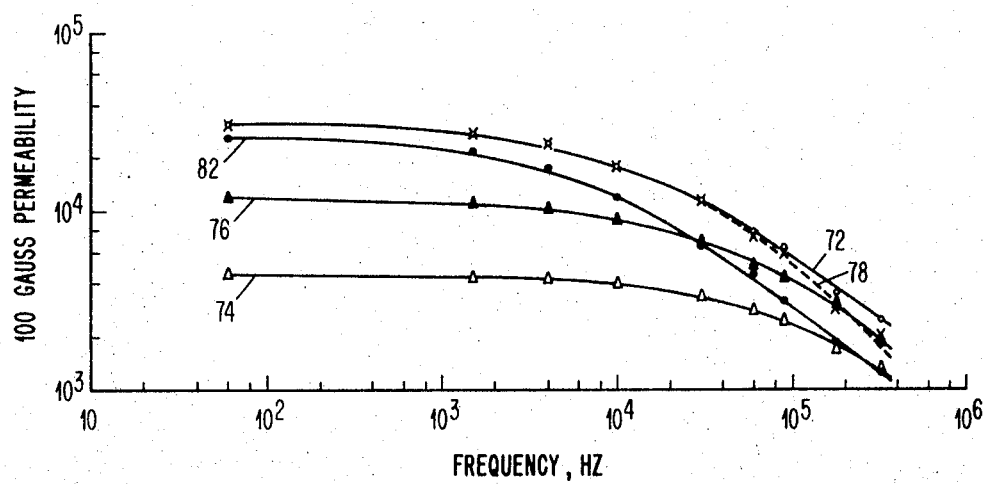
FIG. 7 illustartes the permeability-frequency characteristics of various laminae and laminated structures made in accordance with both the prior art and the present invention.

A number of toroidal laminae of 4–79 molybdenum permalloy one mil thick were annealed by placing them in a hydrogen furnace, bringing the temperature up to 1121° C., maintaining that temperature for two hours. and then allowing the furnace to cool, all in the presence of hydrogen. Avoiding stress and rough handling, the laminae were stacked, wrapped with conductive wire, and subjected to currents of varying frequencies from 60 Hz. to $3.2 \times 10^5$ Hz., its permeability at 100 gauss being measured throughout the range. Curve 72 in FIG. 7 is representative of the data obtained. It is interpreted as showing the ideal or optimum permeability characteristics for annealed material of this type over the frequency range tested.

Prior art

Toroidal laminae of 4–79 molybdenum permalloy one mil thick were annealed in a hydrogen furnace in the same manner as the control laminae. The laminae were then coated with uncured epoxy adhesive, stacked and placed in a flattening fixture to remove their slight degree of curvature due to their rolled foil source. While in this condition, the epoxy was subjected to curing at a temperature of about 170° C. This temperature is far below the annealing temperature of 4–79 molybdenum permalloy. The resulting laminated structure was bonded together by the cured epoxy which also served to insulate the lamina. The permeability-frequency characteristics of the resulting structure were tested in the same manner as the lamina in the control experiment and the results are represented at curve 74 of FIG. 7. It is noted that substantial permeability losses are experienced at all frequencies for compressed epoxy bonded laminated structures as compared with the control laminae. When delaminated, the complete absence of diffusion bonding tacks between the laminae was noted.

To determine how much of the permeability loss in this prior art structure was due to compression strains and how much was due to stresses caused by the epoxy adhesive, a similarly prepared and annealed grouping of 4–79 molybdenum permalloy laminae were stacked in the same fixture with one-half mil thick polyester film interleaved between the laminae. This structure, without epoxy bonding, was then compressed flat, and tested for permeability-frequency variations. As shown at curve 76 in FIG. 7, the resulting structure had permeability characteristics approximately intermediate that of the control laminae curve 72 and the epoxy bonded and compressed laminated structure.

In view of the foregoing data it is apparent that stresses imparted by both the flattening of lamina and by the epoxy contribute to the total permeability losses experienced by the epoxy bonded prior art laminated structure.

Diffusion bonding

Laminae of one mil thick 4–79 molybdenum permalloy were coated with a solution of 1.7% magnesium methylate in methyl alcohol. This coating forms a non-conductive, electrically insulating coating of magnesium oxide on the laminae in accordance with the teaching of U.S. Pat. 2,796,364. This solution was prepared by diluting one part of volume of 5% magnesium methylate in methyl alcohol, obtained from the Anderson Chemical Company of Weston, Mich., with two parts by volume of methyl alcohol. The laminae were coated on both surfaces with the 1.7% magnesium methylate solution, and allowed to dry in air. The resulting coating appeared to be smooth, continuous, and adherent and was measured to be on the order of 0.00007 inch (0.07 mil) thick, as a total for both sides. Control coatings of this thickness were found to decompose upon heating to magnesium oxide coatings of approximately 0.00006 inch (0.06 mil) thick as a total for both sides. (Thickness measurements, where reported, were made with an electronic micrometer purchased from J. W. Dice Co.) The thus coated laminae were then stacked, without the use of adhesive, compressed flat and annealed at 1121° C. for 15 minutes. Following annealing, the stack was found to be bonded together in the form of a unitary laminated structure. Upon testing for permeability-frequency characteristics, the resulting bonded laminated structure exhibited characteristics as represented by curve 78 in FIG. 7. It is noted that the permeability-frequency characteristics of this laminated structure actually overlies that of the control laminae, curve 72, until a frequency of almost $10^5$ Hz. is reached. At the higher frequencies the permeability characteristics of the structure drop off somewhat from that of the control, but are far superior to those of the prior art epoxy-bonded laminated structure.

Upon being subjected to delamination, which was very difficult to achieve due to the tenacity of the bond, it was noted that raised metal tacks of small cross-section were randomly distributed over the face of each lamina. The tacks covered from about 0.3% to about 1.5% of the surface and had clearly penetrated through the MgO insulating layer to bond the metallic laminae together. The tacks were composed of the same material as the laminae and had apparently been formed by diffusion or welding during the annealing process. Cross-sectional cuts through the laminated structure revealed a configuration similar to that shown in exaggerated detail in FIG. 6, with the amount of bonding noted being in agreement with that observed for the delaminated surfaces.

When undiluted, 5% magnesium methylate was coated on metallic lamina, allowed to dry, and the lamina stacked and annealed a unitary laminated structure was not produced. The laminae were not joined by diffusion bonds. The resulting MgO coating for two sides was measured to be at least one mil thick, and it may have been even thicker since it was quite powdery and the electronic micrometer appeared to abrade a portion of the powder away while measurements were being made. Apparently, this is too thick a coating for diffusion bonds to penetrate in a short time. The use of more dilute solutions of magnesium methylate, on the order of about 2.5%, and less, resulted in diffusion bonded lamina of excellent quality. Such coatings are on the order of one-half mil thick, and less, for two sides.

Another grouping of 4–79 molybdenum permalloy laminae one mil thick were formed into a diffusion bonded laminated structure. In this experiment, the laminae were subjected to heating in air for one hour at 427° C., causing the surfaces of the laminae to be formed into non-conductive inorganic metal oxide shells. The thickness of the oxide shell was so slight that it was incapable of being measured by the electronic micrometer. It was estimated that the oxide shells were on the order of several molecules or about one micro-inch (0.001 mil) thick, or less. Following oxidation, the laminae were stacked, compressed, and annealed at 1121° C. for 15 minutes. When tested for permeability-frequency characteristics the resulting bonded laminated structure exhibited characteristics as shown in curve 82 of FIG. 7. It is thus seen that this structure also exhibited characteristics far superior of that of the epoxy-bonded laminated structure, as shown at curve 74. Cross-sectional analysis indicated that bonding in this structure was on the order of 4–7%.

A 1.6% by weight slurry of 0.05μ aluminum oxide in methanol was prepared and coated on magnetic laminae. The slurry was allowed to dry, and the coated laminae were then stacked, flattened, and subjected to annealing at 1121° C. The resulting structure was found to be diffusion bonded together.

Two laminae of Hy Mu 80 were heated at 480° C. in the presence of air for one hour. Following heating, the foil was no longer bright, but had a tarnished appearance indicative of surface oxidation. The two oxidized Hy Mu 80 laminae were stacked together with a copper lamina interleaved between them, the stack pressed flat, and heated at 500–600° C. for one hour under vacuum conditions. The resulting laminated structure formed a well-bonded, unitary stack. Diffusion bonding between laminae was on the order of 10% of the surface area. In a shield structure of this type, eddy current losses due to large amounts of contact between laminae, does not constitute a major concern.

Laminated structures were also made by successfully diffusion bonding lamina composed of U.S. Mumetal (77% nickel, 5% copper, 2% chromium, balance iron) and chrome permalloy (45% nickel, 6% chromium, balance iron). Following annealing the laminations have suitable bonding and permeability characteristics when prepared utilizing the teaching of the present invention.

While a number of specific examples have been given to illustrate preferred embodiments of the present invention, other modifications are clearly within the scope and teaching of this invention. It is clear that there is a time-temperature relationship as to the amount of diffusion bonding occurring between laminae. Increase in either time or temperature will, of course, result in increase in the amount of bonding. Furthermore, the choice of non-conductive material between laminae, as well as its thickness, and the melting point of the laminae material all effect the amount of bonding. Examples of heating and annealing in hydrogen and vacuum have been given. Annealing in other inert, non-reactive or reducing atmospheres will also give suitable results. The presence or absence of a magnetic field during annealing, as is common practice in the art, is a matter of choice.

The various laminated structures prepared in accordance with the present invention may readily be utilized in the construction of a magnetic transducer assembly, or other embodiment utilizing laminated structures. Where the laminated structures are of soft magnetically permeable material they may, for example, serve as a component of a head. Where the structures are a combination of conductive non-magnetic material and magnetic material, they may serve as a shield. In any usage, a superior result will be achieved due to the fine permeability characteristics exhibited by the magnetic material and the low stress characteristics of the conductive metal.

While the invention has been particularly shown and described with reference to preferred embodiments thereof, it will be understood by those skilled in the art that various changes in form and details may be made therein without departing from the spirit and scope of the invention.

We claim:

1. The method of making a substantially unitary laminated structure from a plurality of ductile metallic laminae by diffusion bonding, comprising the steps of:
   providing a thin substantially continuous non-conductive inorganic coating on at least one surface of selected laminae, said coating being about 0.001 mil to 0.5 mil thick and of a physical character such that tacks formed by diffusion between laminae when subjected to stacking and heating, as hereinafter defined, completely penetrate said coating;
   stacking the laminae in substantially registered contacting relationship with one another, with at least one coated surface interleaved between adjacent laminae; and then,
   heating the stacked laminae at a temperature and for a time sufficient to cause small cross-sectional high resistance metallic tacks to form in situ on the laminae, which tacks penetrate completely through the non-conductive coating in a random pattern to mechanically bond each lamina with each immediately adjacent lamina.

2. The method of claim 1, wherein at least a portion of the metallic laminae are magnetically permeable.

3. The method of claim 1, wherein the metallic laminae are magnetically permeable.

4. The method of claim 2, wherein the heating temperature corresponds to the annealing temperature of the magnetically permeable material, whereby the magnetically permeable material is simultaneously annealed and diffusion bonded.

5. The method of claim 3, wherein the heating temperature corresponds to the annealing temperature of the magnetically permeable material, whereby the magnetically permeable material is simultaneously annealed and diffusion bonded.

6. The method of claim 1, wherein the metallic laminae are on the order of about 0.1 mil to about 5 mils in thickness.

7. The method of claim 1, wherein the metallic tacks formed in situ cover about 10% or less of the surface area of each lamina.

8. The method of claim 1, wherein the non-conductive inorganic coating is a metal oxide.

9. The method of claim 8, wherein the metal oxide is magnesium oxide.

10. The method of claim 8, wherein the non-conductive metal oxide coating is formed from a solution of magnesium methylate in a solvent, said magnesium methylate constituting at least about 2.5%, by weight, of said solution.

11. The method of making a laminated pole piece for a magnetic recording head from a plurality of magnetically permeable metallic laminae by diffusion bonding, comprising the steps of:

providing a substantially continuous non-conductive inorganic coating on at least one surface of each lamina, said coating being about 0.001 mil to 0.5 mil thick and of a physical character such that tacks formed by diffusion between laminae when subjected to stacking and heating, as hereinafter defined, completely penetrate said coating;

stacking the coated laminae in substantially registered contacting relationship with one another, with at least one coated surface interleaved between adjacent laminae; and then, heating the stacked laminae at a temperature and for a time sufficient to simultaneously anneal the magnetically permeable laminae and to cause small cross-sectional high resistance metallic tacks to form in situ on the laminae, which tacks penetrate completely through the non-conductive coating in a random pattern covering 10% or less of the surface area of each lamina to mechanically bond each lamina with each immediately adjacent lamina.

References Cited

UNITED STATES PATENTS 3,206,847   9/1965   Keeleric _____ 29—498

JOHN F. CAMPBELL, Primary Examiner

C. E. HALL, Assistant Examiner

U.S. Cl. X.R.

29—470.9, 472.3, 498, 609; 179—100.2 C; 336—219, 234